(12) United States Patent
Stelzl

(10) Patent No.: US 11,020,676 B2
(45) Date of Patent: Jun. 1, 2021

(54) BACKBONE RAIL FOR A ROLLER COASTER AND ROLLER COASTER ARRANGEMENT

(71) Applicant: INGENIEURBÜRO STENGEL GMBH, Munich (DE)

(72) Inventor: Christian Stelzl, Munich (DE)

(73) Assignee: INGENIEURBURO STENGEL GMBH, Munich (DE)

( * ) Notice: Subject to any disclaimer, the term of this patent is extended or adjusted under 35 U.S.C. 154(b) by 0 days.

(21) Appl. No.: 16/467,704

(22) PCT Filed: Dec. 8, 2017

(86) PCT No.: PCT/EP2017/081961
§ 371 (c)(1),
(2) Date: Jun. 7, 2019

(87) PCT Pub. No.: WO2018/104501
PCT Pub. Date: Jun. 14, 2018

(65) Prior Publication Data
US 2020/0001190 A1    Jan. 2, 2020

(30) Foreign Application Priority Data

Dec. 9, 2016  (DE) .................... 10 2016 123 928.3

(51) Int. Cl.
*A63G 7/00* (2006.01)
*A63G 21/04* (2006.01)
(Continued)

(52) U.S. Cl.
CPC .............. *A63G 7/00* (2013.01); *A63G 21/04* (2013.01); *A63G 21/14* (2013.01);
(Continued)

(58) Field of Classification Search
CPC .......... A63G 7/00; A63G 21/04; E01B 25/00; E01B 25/10; E01B 25/22
See application file for complete search history.

(56) References Cited

U.S. PATENT DOCUMENTS 3,949,680 A * 4/1976 Doughty ................ A63G 21/04
                                                     104/124
4,029,019 A * 6/1977 Watkins ................. A63G 21/04
                                                     104/124

(Continued)

FOREIGN PATENT DOCUMENTS

| DE | 19808185 A1 | 9/1998 |
|---|---|---|
| DE | 202015001425 U1 | 3/2015 |
| WO | 2016/109894 A1 | 7/2016 |

OTHER PUBLICATIONS

First Office Action dated Dec. 12, 2019 issued corresponding Chinese Patent Application No. 201780076167.8 with English translation (8 pgs.).

(Continued)

*Primary Examiner* — Robert J McCarry, Jr.
(74) *Attorney, Agent, or Firm* — Pillsbury Withrop Shaw Pittman, LLP

(57) ABSTRACT

A backbone rail for a roller coaster, comprising two rail pipes designed for vehicles to travel upon, and at least one, particularly main load-bearing backbone pipe not designed for vehicles to travel on, whose second moment of area is greater than the second moment of area of the rail pipes, wherein rail pipes and backbone pipe are connected to each other section-by-section by stiffening bulkheads, whereby at least one bulkhead has the following features: A transverse cross member, which extends in the orthogonal direction and connects the rail pipes with each other, and bulkhead plates, connecting at least one rail pipe with the backbone pipe, wherein at least one bulkhead plate is designed as a longi- (Continued)

tudinal bulkhead plate, whose main plane of extension extends perpendicular to the bulkhead plane, and which is attached to the backbone pipe in such a way that it runs tangentially into the backbone pipe. In addition, the invention relates to a roller coaster arrangement with such a backbone rail.

14 Claims, 8 Drawing Sheets

(51) Int. Cl.
    *A63G 21/14*     (2006.01)
    *E01B 25/10*     (2006.01)
    *E04C 3/04*     (2006.01)

(52) U.S. Cl.
    CPC .......... *B60L 2200/26* (2013.01); *E01B 25/10* (2013.01); *E04C 2003/0413* (2013.01)

(56) References Cited

U.S. PATENT DOCUMENTS

| | | | | |
|---|---|---|---|---|
| 5,566,620 A | * | 10/1996 | Siewert | E01B 25/00 104/124 |
| 5,595,121 A | * | 1/1997 | Elliott | A63G 7/00 104/288 |
| 6,047,645 A | * | 4/2000 | Cornwell | A63G 7/00 104/124 |
| 2004/0083922 A1 | | 5/2004 | Gnezdilov | |
| 2016/0250560 A1 | * | 9/2016 | Burger | B61B 3/00 104/53 |

OTHER PUBLICATIONS

International Search Report dated Feb. 26, 2018 issued in corresponding International Patent Application No. PCT/EP2017/081961.
Written Opinion of the International Searching Authority dated Feb. 26, 2018 issued in corresponding International Patent Application No. PCT/EP2017/081961.
International Preliminary Report on Patentability dated Mar. 4, 2019 issued in corresponding International Patent Application No. PCT/EP2017/081961.

\* cited by examiner

BACKBONE RAIL FOR A ROLLER COASTER AND ROLLER COASTER ARRANGEMENT

CROSS-REFERENCE TO RELATED APPLICATIONS

This is the U.S. National Stage of PCT/EP2017/081961, filed Dec. 8, 2017, which in turn claims priority to German Patent Application No. 10 2016 123 928.3, filed Dec. 9, 2016, the contents of each of these applications being incorporated herein by reference in their entireties.

The present invention relates to a backbone rail for a roller coaster or a similar rail-running amusement ride, comprising two rail pipes designed for an arrangement of vehicles to travel upon, and at least one particularly main load-bearing backbone pipe not designed for vehicles to travel upon, whose second moment of area is greater than the second moment of area of the rail pipes, whereby, viewed along the principal axis of extension of the backbone rail, the rail pipes and the backbone pipe are attached to one another section-by-section by means of stiffening bulkheads.

Furthermore, the invention relates to a roller coaster arrangement, comprising a vehicle arrangement and at least one backbone rail of the type described here, whereby the vehicle arrangement is attached or designed to be capable of being attached to the backbone rail in such a way that it can move along the backbone rail.

Such rails and arrangements have been disclosed in prior art, whereby the backbone rail constitutes one potential design method for a roller coaster rail. A multitude of different rail systems are known to guide the vehicle arrangement of a roller coaster or similar rail-running amusement ride along a predefined track geometry. Such rail systems comprise, for example, rails made from wood or steel, with one or more rail profiles of basically arbitrary shape, whereby by the load-bearing capacity of the rail or the individual rail pipes can be improved by stiffening with profiles or plates or suchlike statically effective means, as well as by the connection of supporting profiles etc.

The present invention relates to a common form of execution of a steel rail, i.e., a so-called backbone rail, designed with a particularly main load-bearing backbone pipe, to which, most commonly, two rail pipes are connected, which are designed for vehicles to travel directly upon them. The backbone pipe is not designed for vehicles to travel upon. The rail pipes are typically designed as round pipes of identical diameter, the backbone pipe typically as a round pipe with a substantially higher second moment of area than the rail pipes. The backbone pipe thereby typically acts as the main load-bearing member, with the rail pipes transmitting the major part of their loads into the backbone pipe. However, it is quite common for the rail pipes themselves to additionally transmit some portion of the load. For stiffening and transmission of loads from the rail pipes and backbone pipe, hollow profiles or transverse bulkhead plates are commonly used, which are arranged between the individual pipes. What is relevant in this context is that the profiles or transverse bulkhead plates are arranged in such a way that they will not obstruct the free running of the wheels or other parts of the vehicle arrangement along the backbone rail and particularly along the rail pipes on which the vehicles are travelling. The stiffening members of such backbone rails are usually arranged in the normal section of the backbone rail. The normal section of the backbone rail is optionally referred to below as bulkhead plane. In addition, such bulkheads are usually arranged along the rail in sections, i.e. at a specific distance from each other.

The load-bearing action of a backbone rail generally relies on the principle of the frame load-bearing effect of a moment resisting frame (Vierendeel girder). As opposed to a triangulated truss, the Vierendeel girder requires a stiff design of the connecting points with respect to bending between the members, i.e. in this case the pipes, in order to activate the parallel axes components (Steiner components) of the rail pipes through the frame load-bearing effect. The arrangement of diagonal stiffeners is not required. Particularly in the case of a low frame load-bearing effect due to soft bulkhead plates, the backbone pipe essentially has a main load-bearing function. The stiffening members and particularly bulkheads arranged between the rail pipes and the backbone pipe additionally serve to transmit the loads introduced into the rail pipes from the vehicle arrangement into the backbone pipe.

Unlike the backbone rails described above, so-called truss rails are disclosed in prior art, in which the rail pipes are connected for stiffening purposes to each other and to one or more chord pipes by means of post profiles extending orthogonally in bulkhead planes as well as diagonally. Pipes and posts constitute a truss structure, whose members are exposed to tensile and compressive forces—loads acting on the members are primarily transmitted as normal forces to the rail bearing points. Backbone rail and steel truss rail are two fundamentally different rail arrangements, used by the designer of a roller coaster as a function of the desired look, expected loads, unsupported spans, desired number of supports, financial means available, etc.—mixed forms are not employed.

The backbone rail differs from the truss rail in so much as its backbone pipe is used as the main load-bearing element; its second moment of area is therefore always higher than that of the rail pipes attached to it. This is not true, or only to a minor extent, in the case of the truss structure. In addition there are no diagonal stiffening members in the case of the backbone rail, arranged between the bulkheads as diagonal stiffening between the rail pipes and/or between the rail pipe and the backbone rail.

In a common embodiment of a backbone rail, a left and a right rail pipe are connected in bulkhead planes by means of stiffening transverse profiles. In the area of these transverse profiles, the backbone pipe is coupled to the rail pipes in bulkhead planes by means of post profiles, whereby the post profiles, in typical embodiments, take the form of one or more round or rectangular hollow profiles. In special embodiments, the post profiles are designed as cone-shaped profiles, whose wider base is connected to the backbone pipe, whereas the opposite, narrower side of the cone is connected to the respective rail pipe.

A further common embodiment uses a single transverse bulkhead plate to directly connect the rail pipes and the backbone pipe. This transverse bulkhead plate is arranged essentially orthogonally to the main axis of extension of the backbone rail.

The disadvantage of the embodiment with stiffening post profiles extending between rail pipe and backbone pipe lies in the complexity of the design, as each individual post profile has to be adapted specifically to its required mounting position. The embodiment with transverse bulkhead plate presents advantages in this respect, however, such a backbone rail has a lower fatigue strength; it usually falls behind the embodiments with stiffening post profile.

DE 20 2015 001 425 U1 discloses a steel truss rail for a roller coaster or similar amusement ride, comprising two rail pipes designed for a wheel arrangement to travel upon directly, and a chord pipe, not designed for vehicle to travel upon, in which the rail pipes and the chord pipe are connected in a stiffening manner by means of truss profiles, and in which the truss profiles running between the chord pipe and the respective rail pipe are least in part directly attached to the chord pipe and to the rail pipe.

WO 2016 109 894 A1 discloses a rail component with a triangular beam having an upper plate, a first side plate and a second side plate, whereby a lower surface of the upper plate is in contact with the first edge of the first side plate, and in which the lower surface of the upper plate adjoins the first edge. The edge of the second side plate and the second lateral edge of the first side plate abut with the second lateral edge of the second side plate and a rail component, which has at least one rail positioned adjacent to an upper surface of the upper plate.

The purpose of the present invention is to provide an improved backbone rail, which offers both, improved fatigue strength compared to the embodiment with transverse bulkhead, and reduced manufacturing complexity compared to the embodiment with post profiles.

This challenge is met by a backbone rail and a roller coaster arrangement, respectively, in accordance with the independent claims.

This challenge is met by a backbone rail for a roller coaster or similar rail-running amusement ride, comprising two rail pipes designed for a vehicle arrangement to travel upon, and at least one particularly main load-bearing backbone pipe not designed for vehicles to travel upon, whose second moment of area is greater than the second moment of area of the rail pipes, whereby, looking in the main axis of extension of the backbone rail, the rail pipes and the backbone pipe are connected section-by-section by means of stiffening bulkheads, whereby at least one bulkhead has the following features: a transverse connecting member, which connects the rail pipes to each other and which, extending between the rail pipes orthogonally to the main axis of extension of the rail, is attached to the rail pipes, and bulkhead plates, each of which connects one rail pipe to the backbone pipe, whereby at least one bulkhead plate is designed as a longitudinal bulkhead plate, whose main plane of extension is perpendicular to the bulkhead plane, and which is attached to the backbone pipe in such a way that it runs into the backbone pipe tangentially.

Furthermore this challenge is met by a roller coaster arrangement comprising a vehicle arrangement and at least one backbone rail in the manner described here, whereby the vehicle arrangement is designed such that it is attached or can be attached to the backbone rail in such a way that it can move along the backbone rail.

Further to the above definition of a backbone rail, it should be mentioned here that a backbone rail is optionally understood as a rail, whose backbone pipe is designed to be the main load-carrying element, whereby the rail pipes principally serve to introduce the loads created by the vehicle arrangement into the backbone rail, and only in the second place contribute towards increasing the load-bearing capacity of the entire backbone rail.

Optionally, the backbone rail in accordance with the present invention provides a second moment of area which is at least higher by a factor of 1.5, optionally at least by a factor of 2, and still optionally, by a factor of 3 or more than the second moment of area of the rail pipes.

A backbone rail is optionally also specified, and in particular, differentiated from a truss structure rail, by the fact that, viewed along the main axis of extension of the rail, it does not have any diagonally arranged stiffening diagonal struts extending between the rail pipe and backbone pipe and/or between the rail pipes in most of the partial segments between two adjacent bulkheads, and particularly in partial segments in which a mean load is acting during roller coaster operation. Such diagonal stiffening members in the fields between the bulkheads are not provided for this rail type, preferably not in general, or at least only for locally increasing stiffness.

The backbone rail is optionally made from a metallic or similar statically effective material.

The term rail pipe within the scope of the present invention optionally comprises any type of pipe with a cross sectional geometry suitable for transmitting loads. Preferably, the term is to be understood as a closed-wall girder, and above all, pipes with a circular cross section. However, other pipe geometries and specifically hollow-profile geometries can also be used. All of these are summarily referred to as "pipes" within the scope of the present invention. The term shall comprise, amongst others, rectangular profiles, box profiles or similar closed profiles, but also open profiles such as T-profiles, I-profiles, multi-layer or multi-element profiles.

The same also applies to the backbone pipe, whereby the backbone pipe may optionally be designed with an arbitrary hollow profile geometry, allowing a tangential connection of the at least one longitudinal bulkhead plate to the backbone pipe. In particular, the backbone pipe may also be designed as a component having a cross section with at least one curved and/or inclined cross sectional sector. An embodiment with a box-profile is also conceivable.

In accordance with the invention, at least one bulkhead plate, designed as a longitudinal bulkhead plate, runs into the backbone pipe tangentially. "Tangentially" optionally means that only certain plates and particularly more than 70%, and further optionally, more than 80% of the longitudinal bulkhead plates of the backbone rail must meet this condition. It is conceivable that the longitudinal bulkhead plates tangentially run into the backbone pipe only at some bulkhead positions, whilst deviating slightly from the tangential direction at other bulkheads, and, in particular, deviating such that certain angles of deviation a are adhered to. This will be described in detail below. Optionally, the term "tangentially" is to be understood such that in the case of a straight-running backbone rail, that is, a rail in which rail pipes and backbone pipe run parallel to one another at least in a section, the longitudinal bulkhead plate is attached such that it runs into the backbone pipe tangentially, whereby deviations due to manufacturing tolerances are acceptable, and whereby in the case of a rail deviating from the completely straight direction, e.g. a curved or twisted rail, this tangentiality is deviated from to some minor degree, due to the resulting geometrical direction differences of the tangent vectors of the individual pipes. Optionally, "tangentially" means that a deviation from the requirement for a tangentially running-in attachment is permitted in some sections, due to the geometrical conditions and within the framework of manufacturing tolerances. Furthermore deviations from this tangential-requirement in the sense of an "substantially tangentially" arrangement are also covered by the invention, especially due to the necessity of allowing the parts to be connected and especially welded together in a reliable and easy to handle manner. Further, definitions what optionally also can be understood by "tangentially" can be found further down below.

In this context in particular, at least one longitudinal bulkhead plate is optionally arranged on the backbone rail in such a way that its central surface runs tangentially into the central surface of the backbone pipe, and in particular in such a manner that its central surface runs into the central surface of the backbone pipe deviating by no more than a maximum dihedral angle α of ±32°, optionally by a maximum dihedral angle α of ±25°, optionally by a maximum dihedral angle α of ±20°, and still optionally, by a maximum dihedral angle α of ±10° relative to the tangential direction $R_T$. The central surface is defined as the geometrical area situated in the middle between the upper and lower surfaces of a component, and in this case, e.g., of the pipe wall of the backbone pipe or the longitudinal bulkhead plate. In the case of a plate having a thickness t the central surface will therefore have a distance of t/2 from the top surface of the plate, and extend in a plane parallel to the latter. Due to geometric dependencies the dihedral angles measured on the inner surface, the central surface and the outer surface of the longitudinal bulkhead plate deviate from each other, wherein it holds that the dihedral angle of the inner surface is bigger than the dihedral angle of the middle surface is bigger than the dihedral angle of the outer surface, each angles measured with regard to the respective backbone pipe surface.

It has to be understood that in general the definition of the "tangentiality" within this disclosure covers the above ranges of angels between the central surfaces of connected pipes, i.e. especially covers an arrangement where the longitudinal bulkhead plate is attached to and runs into the backbone pipe inscribing a maximum dihedral angle α of ±32°, optionally a maximum dihedral angle α of ±25°, optionally a maximum dihedral angle α of ±20°, and still optionally, a maximum dihedral angle α of ±10°.

The specification that the longitudinal bulkhead plate is designed such that its main axis of extension is perpendicular to the bulkhead plane also has to be understood in the light of the above definitions, and in particular must be understood such that optionally this condition applies to a completely straight backbone rail, whereby deviations within the framework of manufacturing tolerances may be present. In the case of a curved or twisted rail, such deviations may be higher, as in these cases the main axes of extension of backbone pipe and rail pipes may sometimes deviate from one another. This occasionally leads to a deviation of the arrangement of the longitudinal bulkhead plate from the orthogonal towards the bulkhead plane. Optionally, particularly in such a situation, an averaged alignment of the longitudinal bulkhead has to be selected, such that, on average, the main axis of extension of the longitudinal bulkhead plate deviates uniformly from the main axis of extension of the backbone pipe and from the main axis of extension of the rail pipes.

The embodiment of the backbone rail in accordance with the invention, with transverse connecting members connecting the rail pipes, and bulkhead plates connecting the rail pipes with the backbone pipe, in which at least one such bulkhead plate, and preferably two bulkhead plates, are designed as longitudinal bulkhead plates, leads to a rail arrangement with a fatigue strength which is significantly higher compared to the rail arrangements known from prior art, whilst at the same time significantly facilitating manufacture. In particular, the attachment of longitudinal bulkhead plates between rail pipe/transverse connecting member and backbone pipe is usually possible without time-consuming adaptation of the longitudinal bulkhead plates. The tangential arrangement of the longitudinal bulkhead plate on the backbone pipe according to the present invention moreover guarantees optimum transmission of loads, such that a reduction of the wall thickness of the backbone pipe is conceivable. Furthermore, the use of the longitudinal bulkhead plates enables manufacturing tolerances and also axial deviations of the main axes of extension of the rail pipes and backbone pipe relative to each other to be allowed for very easily, particularly in the case of curved designs of the backbone rail, e.g. in curves. This will significantly reduce the manufacturing cost of the backbone rail compared to rail arrangements disclosed in prior art.

Optionally the backbone rail is designed such that in a straight rail section, i.e. in an area in which the main axes of extension of the rail pipes and the backbone pipe run parallel to each other, the longitudinal bulkhead plate is designed such that it is attached to the backbone pipe in such a manner that it runs into the backbone pipe tangentially. Furthermore, in the case of such a straight rail, the longitudinal bulkhead plate is optionally designed such that its main plane of extension is perpendicular to the bulkhead plane. As soon as the backbone rail deviates from this straight design, for example in a curve etc., the deviation of the different main axes of extension of the rail pipes and/or backbone pipe relative to each other may result in a deviation of the tangentiality of the longitudinal bulkhead plate, but this is nevertheless referred to as a tangentially running-in attachment to the backbone pipe. The same applies for the design of the longitudinal bulkhead plate such that it is perpendicular to the bulkhead plane; in the case of a non-straight backbone rail, the longitudinal bulkhead plate is then optionally so designed that it is essentially perpendicular to the bulkhead plane.

Optionally, the longitudinal bulkhead plate is designed to be in contact with the outer surface of the backbone pipe, whereby attachment of the longitudinal bulkhead plate to the backbone pipe is provided for in the contact area, for example by means of one or more welded joints. In this way, for example, a longitudinal bulkhead plate may be arranged between rail pipe and backbone pipe or between transverse connecting member and backbone pipe irrespective of its length, without the longitudinal backbone plate having to be cut to length. Optionally, it is also possible for the longitudinal bulkhead plate to run into the rail pipe tangentially, and preferably in an area opposite to the other rail pipe in particular, or, as will be described in detail, to run tangentially into the transverse connecting member. In these cases, too, a connection by welded joints or similar methods is possible.

Optionally, the longitudinal bulkhead plate is attached to the rail pipe by means of the transverse connecting member. Optionally, the longitudinal bulkhead plate is therefore attached to the transverse connecting member, which in turn is arranged between the rail pipes, such that there is a positive transmission of forces between the rail pipe and the backbone pipe by way of the transverse connecting member. In a special embodiment, the longitudinal bulkhead plate is designed to preferably surround the transverse connecting member. This may be achieved, for example, through an opening corresponding essentially to the partial outer geometry of the transverse connecting member. Particularly in cases in which the transverse connecting member is designed as a transverse connecting pipe, the opening is preferably designed as an elliptical opening, which can furthermore optionally be brought into contact with the transverse connecting member with essentially precise fit, and, in particular, welded to the latter. The longitudinal bulkhead plate therefore optionally has an opening which essentially permits the longitudinal bulkhead plate to be brought into contact with the transverse connecting member with a precise fit, and subsequently attached and, specifically, welded. To this end, the opening on the longitudinal bulkhead plate may be designed such that some degree of play is ensured between longitudinal bulkhead plate and transverse connecting member prior to attachment, and particularly welding. This allows stress-free alignment of the longitudinal bulkhead plate on the transverse connecting member.

Optionally the transverse connecting member is arranged to extend in the bulkhead plane, and/or the longitudinal bulkhead plate is arranged to intersect the bulkhead plane. In particular, a central axis of the longitudinal bulkhead plate is optionally arranged in a direction between rail pipe and backbone pipe in the bulkhead plane, and particularly in one plane with the transverse connecting member.

The central axis extends from the middle of the longitudinal bulkhead plate end pointing towards the backbone pipe, particularly an attachment area, towards the middle of the end pointing towards the rail pipe or transverse connecting member. Optionally, the longitudinal bulkhead plate is designed to protrude from the bulkhead plane on both sides, when viewed along the main axis of extension of the rail. A particular embodiment is formed when the longitudinal bulkhead plate runs directly between backbone pipe and rail pipe and is, in particular, connected to the rail pipe. In these cases, it is possible for the transverse connecting member to be arranged with a forward or backward offset relative to the longitudinal bulkhead plates, particularly in the main axis of extension of the rail, and not to be arranged in the bulkhead plane formed by the longitudinal bulkhead plates. In a particular embodiment, the bulkhead plane is a plane intersecting the longitudinal bulkhead plate and arranged orthogonally relative to the main axis of extension of the backbone rail.

Optionally the transverse connecting member is designed as a hollow profile and particularly as a pipe. All hollow profiles disclosed in prior art, such as box profiles, rectangular profiles, trapezoidal profiles, pipe or oval profiles may be used.

Optionally the longitudinal bulkhead plate is attached to the rail pipe such that it runs tangentially into the rail pipe. What was previously disclosed for the tangentially running-in attachment on the backbone pipe applies identically.

In this context in particular, the transverse connecting member is optionally arranged to extend in the bulkhead plane, and the longitudinal bulkhead plate is arranged so as not to intersect the bulkhead plane. This means that the longitudinal bulkhead plate is optionally arranged outside the bulkhead plane. The result is a more uniform distribution of the number of welds along the main axis of extension of the backbone rail, which e.g. improves weldability.

In this context in particular, the transverse connecting member is optionally designed as a transverse connecting plate. This is particularly advantageous in the case of a backbone rail featuring longitudinal bulkhead plates arranged outside the bulkhead plane, as described above, since in this case the transverse connecting members are loaded in tension only.

Optionally the transverse connecting member may be connected to the rail pipes at a certain distance from the backbone pipe. In the case of such an embodiment in particular, the transverse connecting member is not directly connected to the backbone pipe. A connection is made exclusively through the bulkhead plates. Such a design is advantageous in particular in the case of an embodiment, in which the bulkhead or bulkheads are connected to the rail pipes through the transverse connecting members.

Optionally, a multiplicity of longitudinal bulkhead plates is provided on the bulkhead, and in particular, at least two longitudinal bulkhead plates are provided per bulkhead, whereby each rail pipe is connected to the backbone pipe through at least one longitudinal bulkhead plate. Such a connection can be executed as a direct connection between the longitudinal bulkhead plate and the rail pipe, but also as an indirect connection, for example by means of the transverse connecting member, whereby in that case the longitudinal bulkhead plates situated closer to the rail pipe will be considered as the ones connecting the rail pipe with the backbone pipe. Furthermore, a multiplicity of longitudinal bulkhead plates is optionally provided on the bulkhead, i.e. outer longitudinal bulkhead plates and at least one inner longitudinal bulkhead plate, situated between these outer longitudinal bulkhead plates when viewed in the bulkhead plane. Viewed in the bulkhead plane is to be understood in the present context as meaning in a view of the bulkhead plane, and specifically in a view coaxial to the main axis of extension of the backbone rail. Optionally, at least two outer longitudinal bulkhead plates are provided, running to a left and right rail pipe, respectively. The bulkhead plates optionally have opposing angles with regard to a perpendicular bisector running from the centre of the transverse connecting member to the backbone pipe, and in particular two angles that differ only with regard to the arithmetic sign. It may be true for the outer and inner longitudinal bulkhead plates that at least one of these longitudinal bulkhead plates is attached to the backbone pipe such that it runs into the backbone pipe tangentially. Optionally, it may be true that at least the outer longitudinal bulkhead plates are attached to the backbone pipe such that they run into the backbone pipe tangentially. Further optionally, it may be true that all outer and inner longitudinal bulkhead plates are attached to the backbone pipe such that they run into the backbone pipe tangentially.

Optionally at least one longitudinal bulkhead plate, and particularly outer longitudinal bulkhead plates, is/are attached in one end area of the transverse connecting member each and/or at least the one inner longitudinal bulkhead plate, and particularly two inner longitudinal bulkhead plates, is/are attached in one inner area of the transverse connecting member, situated between the end areas of the transverse connecting member, when viewed in the bulkhead plane. This means that the outer longitudinal bulkhead plates optionally enclose the inner longitudinal bulkhead plates, when viewed in the bulkhead plane. Optionally, outer and inner longitudinal bulkhead plates are all arranged orthogonally to the bulkhead plane. It is, however, also possible for at least one outer and/or inner longitudinal bulkhead plate to be arranged orthogonally to the bulkhead plane, and for other longitudinal bulkhead plates, particularly outer and/or inner bulkhead plates, not to be arranged orthogonally.

Optionally a multiplicity of outer and inner longitudinal bulkhead plates are arranged such that they adopt the shape of a "W" or a similar zig-zag-shape when viewed in the bulkhead plane. Optionally a multiplicity of longitudinal bulkhead plates, and specifically outer and inner longitudinal bulkhead plates are alternatingly designed with a positive and negative angle of inclination relative to an axis extending between the centre of the transverse connecting element and of the backbone pipe. This, too, results in a zig-zag shape, whereby the absolute angles of inclination relative to one another may be designed to be either the same or different. It is also conceivable that a multiplicity of longitudinal bulkhead plates are arranged side by side and with angles of inclination having the same arithmetic sign.

The central axes of multiple longitudinal bulkhead plates are preferably situated in one plane, and in particular, in the bulkhead plane. It is also possible for the central axes of the outer longitudinal bulkhead plates to be situated in one plane, whereas the central axes of the inner longitudinal bulkhead plates are situated outside this plane, or vice versa. Optionally it is also possible that only the centres of the ends of the longitudinal bulkhead plates pointing towards the backbone pipe comply with this requirement. This is also conceivable with respect to the centres of the ends of the longitudinal bulkhead plates pointing towards the rail pipes or the transverse connecting member.

Optionally, at least one bulkhead plate is designed as a transverse bulkhead plate, whose main plane of extension runs between longitudinal bulkhead plates and/or is designed in such a way that in the plan view of the backbone rail, i.e. in a plane perpendicular to a plane defined by the rail pipes and the transverse connecting member, the longitudinal bulkhead plates and the transverse bulkhead plate adopt the shape of the letter "H". Optionally the transverse bulkhead plate is attached to the rail pipes and the backbone pipe, and, in particular, welded to these components. Optionally, the transverse bulkhead plate is attached to the transverse connecting member and the backbone pipe, and, in particular, welded to these components. Optionally the transverse bulkhead plate is attached, and in particular, welded to the transverse cross member, and not connected, in particular not welded, to rail pipes. Furthermore, the transverse bulkhead plate may also be attached to at least one longitudinal bulkhead plate. In addition, a multiplicity of such transverse bulkhead plates may be provided. Also, the transverse bulkhead plate may conceivably be arranged such that it adjoins the transverse cross member tangentially or in a similar manner that closely follows the shape of the transverse cross member. It is also possible for the transverse bulkhead plate to be laterally in contact with the transverse connecting member and attached to the latter. The transverse bulkhead plate may conceivably abut the lateral edge of at least one longitudinal bulkhead plate or be attached to the latter.

The transverse bulkhead plate optionally has an opening whose outer geometry or outer edge corresponds to at least a part of the backbone pipe. In this way the transverse bulkhead plate can be positioned on the backbone pipe easily. In particular, this opening may be elliptical in shape. The opening is preferably designed such that it allows not only orthogonal positioning of the transverse bulkhead plate on the backbone pipe (that is, parallel to the cross section of the backbone pipe) but also inclined positioning with regard to the latter. Optionally, two or more transverse bulkhead plates may conceivably be provided and connected to one, or preferably two, longitudinal bulkhead plates, and/or designed at least as a partial box profile. In particular, the transverse bulkhead plate may conceivably be arranged on the backbone pipe and the transverse connecting member such that it extends parallel to the bulkhead plane. Also, the transverse bulkhead plate may conceivably be designed such that its inclined about an axis running in the bulkhead plane and between the longitudinal bulkhead plates.

Optionally at least one inner longitudinal bulkhead plate may conceivably be arranged at a distance from at least one outer longitudinal bulkhead plate. In this context, the arrangement of the foot areas, i.e. the areas in which the longitudinal bulkhead plates are attached to the backbone pipe or rail pipe is of particular significance, whereby a certain distance is provided preferably in these attachment areas. The same may also apply to the inner longitudinal bulkhead plates, whereby preferably a certain distance is provided in the attachment areas between inner longitudinal bulkhead plate and backbone pipe or rail pipe.

In addition, the same may also apply to the transverse bulkhead plate, which is optionally arranged at a distance from at least one longitudinal bulkhead plate. The advantage of such a design lies in that, in the case of different outer geometries of longitudinal bulkhead plates, a transverse bulkhead plate can be chosen such that it can be positioned as transverse bulkhead plate between rail pipes or transverse connecting members and backbone pipe without requiring further adaptation.

Optionally the width of at least one longitudinal backbone pipe decreases with increasing distance from the backbone pipe, at least over a section. Relating to this, in particular, the longitudinal bulkhead plate, in particular, has a foot area which is attached to the backbone pipe as the widest area of the longitudinal bulkhead plate. Hence, the longitudinal bulkhead plate optionally has its maximum thickness in the attachment area to the backbone pipe.

At least one longitudinal bulkhead plate has at least one pressed-in bead, welded-on stiffener or similar means of reinforcement to increase load-bearing capacity. To this effect all methods disclosed in prior art for increasing load-bearing capacity, and particularly, increasing load-bearing capacity in the direction of the normal load, can be applied.

As mentioned previously the invention also relates to a roller coaster arrangement comprising a vehicle arrangement and at least one backbone rail in accordance with one of the preceding claims, whereby the vehicle arrangement is attached, or can be attached, to the backbone rail in such a way that it can move along the backbone rail. Such a roller coaster arrangement may comprise all backbone rails described in this document, and in particular defined in the various dependent claims in various embodiments. For reasons of redundancy, reference is made here to what wasw previously said in the respective context.

Further embodiments of the invention are defined by the dependent claims.

The invention is described below using examples of embodiments, which are further clarified by the enclosed drawings. The following is shown schematically in the drawings.

Figure 1:
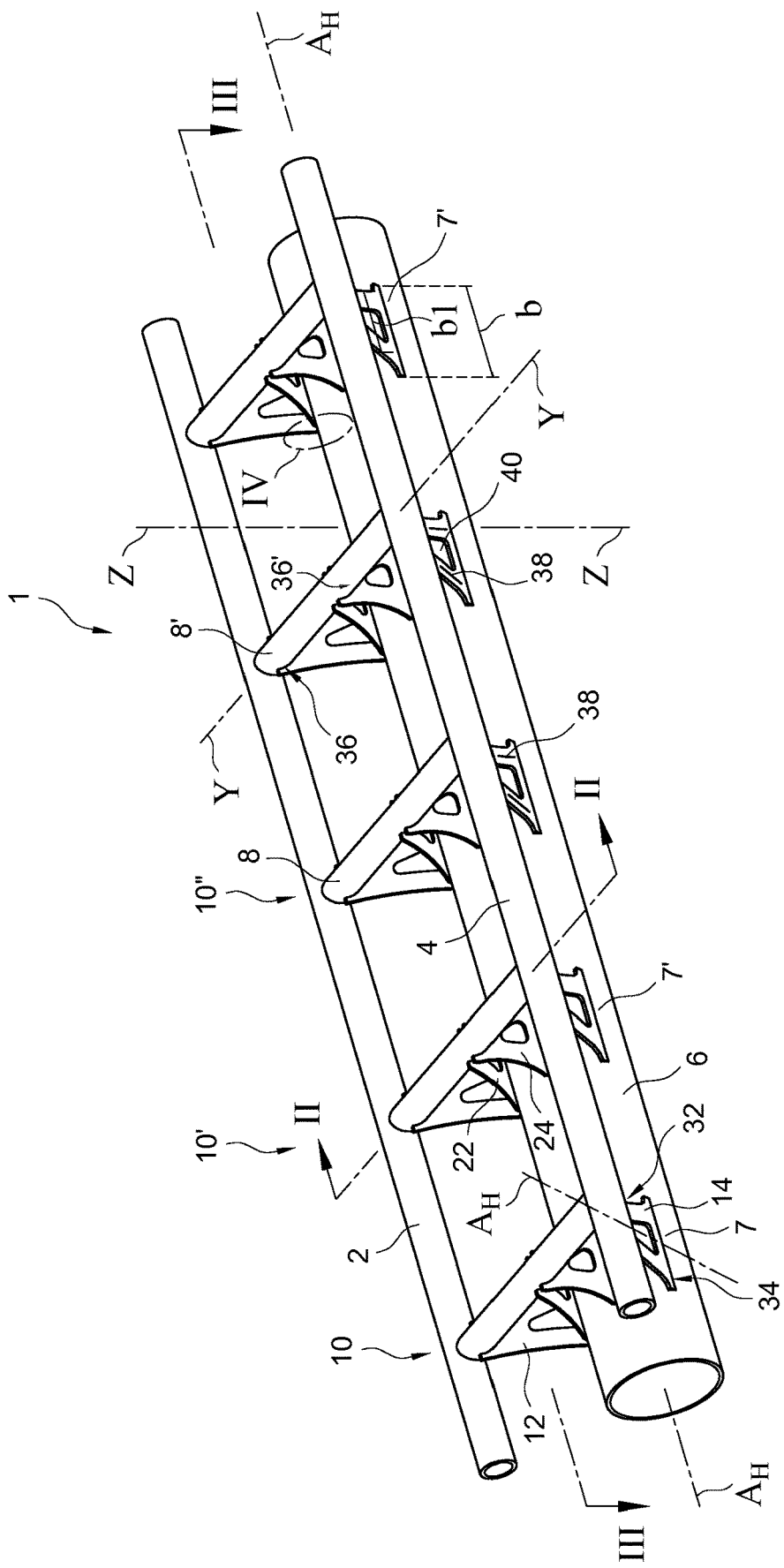
FIG. 1 is an isometric presentation of an embodiment of the backbone rail according to the invention.

In the following text, the same reference signs are used for identical and identically acting components, whereby superscripts may be used in some cases.

Unless otherwise defined, all terms used here (including technical and scientific terms) have the same meaning, and, in particular, a meaning generally understood by an average person skilled in the art, when interpreted in the context of the description and the drawings. It is also to be understood that terms such as those defined in generally used dictionaries will be interpreted in relation to the technical subject discussed here, rather than in an idealised or excessively formal sense, unless explicitly defined in this way. In certain cases, a detailed description of generally known fixtures and methods can be omitted, in order to avoid redundancy in the description. The description of certain embodiments and the terminology used to this end is not to be interpreted as limiting the invention. Unless the context unambiguously dictates otherwise, singular forms shall also include plural forms. The expression "and/or" includes any and all combinations of one or more of the associated listed objects. It goes without saying that the terms "comprises" or "comprising" define the presence of the features mentioned, but do not preclude the presence or addition of other features. Further, it is to be understood that, if a certain step of a method is specified as following another step, it may, unless explicitly stated otherwise, either follow said other step directly, or certain other intermediate steps may be performed prior to said step being executed. In the same manner, it is to be understood that where a connection between structures or components is described, this connection may be made either directly or by means of intermediate structures or components, unless explicitly stated otherwise. Reference is made here explicitly to the disclosure content of all publications, patent applications, patents and other literature mentioned here in their entirety. In the event of a conflict, the present specification shall be applied, including its definitions.

The invention is described here with the help of the enclosed drawings showing embodiments of the invention. The invention, however, may also be executed in many different forms and should not be understood as being restricted to the embodiments explained here. Rather, these embodiments are described here for the sake of diligence and to ensure that this disclosure fully and completely explains the scope of the invention to persons skilled in the art fully, but with the help of examples. The description of the examples of embodiments is to be read in connection with the enclosed drawings, which are to be seen as a constituent part of the written description as a whole. Absolute and relative magnitudes of systems, components, layers and areas may be exaggerated in the drawings for the sake of clarity. Embodiments may be described by means of schematic and/or cross-sectional illustrations, idealized embodiments or intermediate structures of the invention. Relative terms and terms derived therefrom should be understood as relating to the alignment as described or shown in the drawing being discussed. Such relative terms are used to enhance the clarity of the description and do not require the system to be built up or operated in a specific alignment, unless explicitly stated otherwise.

For the sake of clarity, and to provide a concise description, features are usually described here as part of single or separate embodiments; however, it goes without saying that the scope of the invention may also comprise embodiments exhibiting combinations of all or some of the features described.

Figure 2:
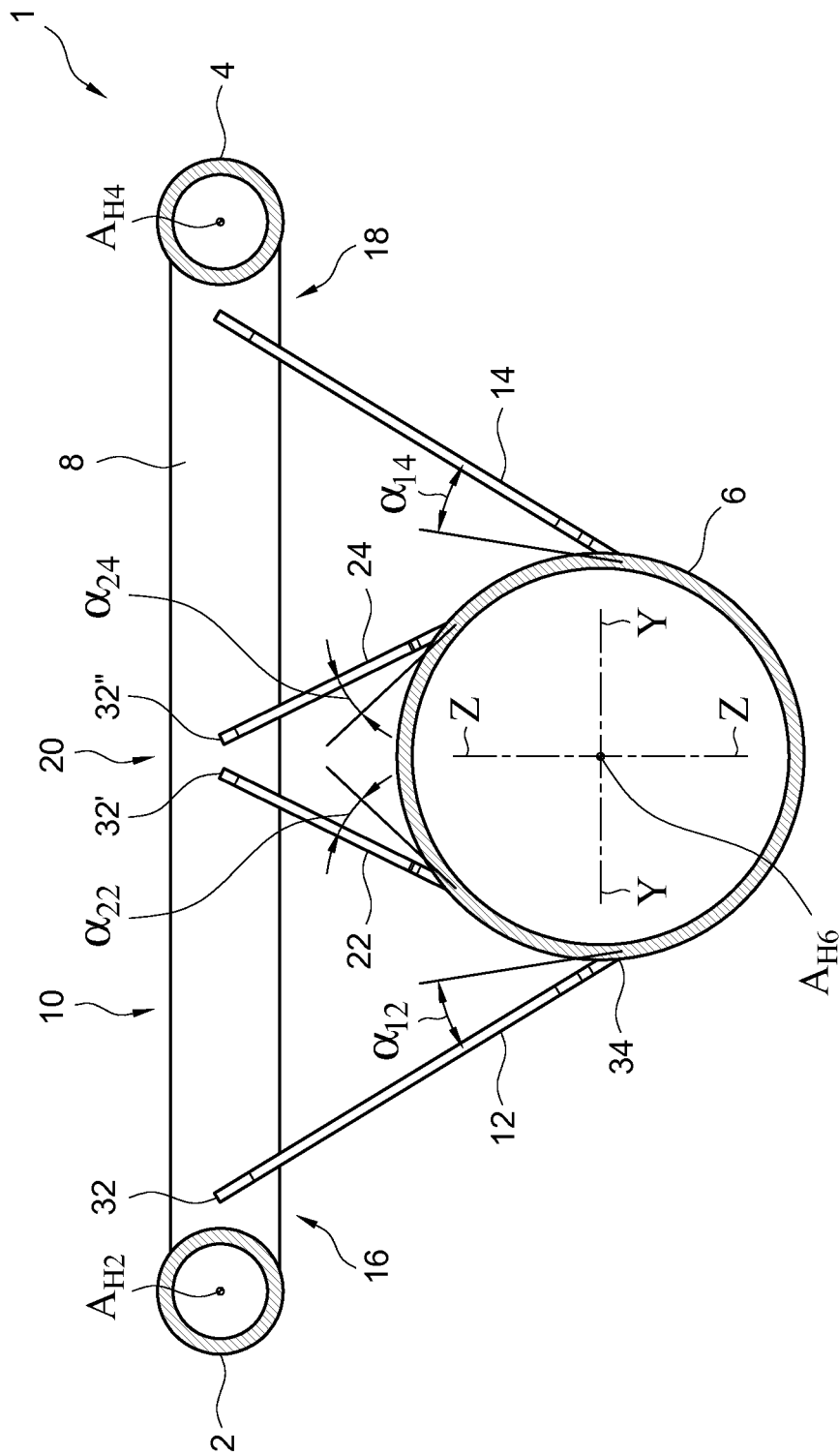
FIG. 2 is a cross section of the embodiment along the section line shown in FIG. 1.
Figure 3:
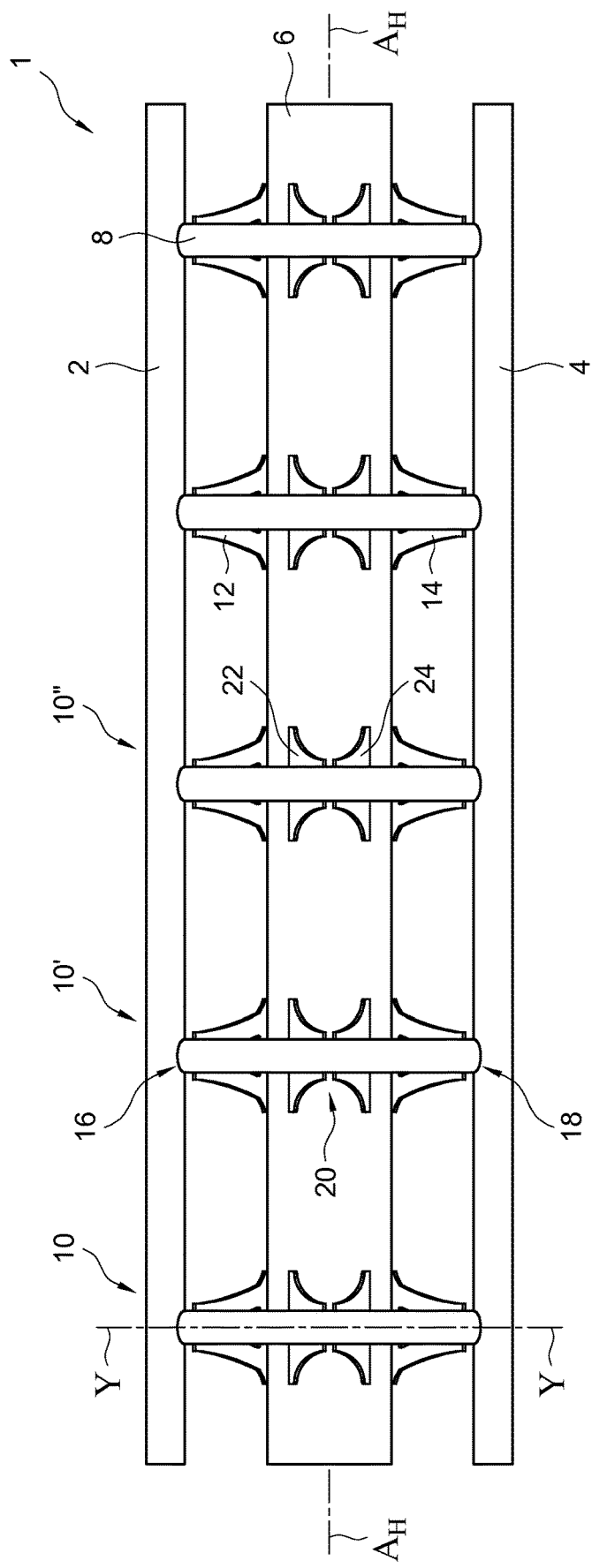
FIG. 3 is a plan view of the embodiment along the line of view shown in FIG. 1.

FIGS. 1 to 4 show different views and sections of one embodiment of the backbone rail 1 according to the invention for a roller coaster or similar rail-running amusement ride. The backbone rail 1 comprises two rail pipes 2, 4 designed for a vehicle arrangement (not shown) to travel upon, and at least one particularly main load-bearing backbone pipe 6 not designed for vehicles to travel upon. As can be seen in FIG. 2 in particular, the backbone pipe 6 has a higher second moment of area than the rail pipes 2, 4. As previously described, the backbone pipe in such a backbone rail 1 is considered on the one hand, as particularly main-load bearing, i.e. it supports significantly larger portion of the load acting upon the entire rail compared to the rail pipes. On the other hand, the Steiner components of the rail pipes are activated by the frame load-bearing effect. To this extent the load-bearing effect of a backbone rail is in clear contrast to the load-bearing effect of a truss rail.

The rail pipes 2, 4 and the backbone pipe 6 are connected section-by-section along the main axis of extension $A_H$ by stiffening bulkheads 10. Each bulkhead 10 in accordance with the invention has the following features:

At least one transverse connecting member 8, which connects the rail pipes 2, 4 to each other and which, extending between the rail pipes 2, 4 orthogonally to the main axis of extension $A_H$ of the backbone rail 1, is attached to the rail pipes 2, 4. The transverse connecting member 8 is described here as having the form of a pipe, but may in principle have the geometry of any hollow profile. Also, one or more transverse connecting members may conceivably be arranged in one bulkhead. The transverse connecting member is described here as being attached to the rail pipes 2, 4 by welded joints.

In addition, the bulkhead 10 has bulkhead plates 12, 14, 22, 24, connecting at least one rail pipe 2, 4, and, by way of example, in the embodiment considered here, two rail pipes 2, 4, to the backbone pipe 6. In accordance with the invention the bulkhead plates 12, 14, 22, 24 may be designed as longitudinal bulkhead plates, with main planes of extension perpendicular to the bulkhead plane. By way of example, the bulkhead plane of a bulkhead 10 is defined in the isometric diagram in FIG. 1 by the depicted Z-axis and the Y-axis. In this embodiment the main axis of extension $A_H$ of the backbone rail 1 is arranged orthogonally with respect to this bulk-head plane. The main plane of extension of at least one bulkhead plate, and, in this embodiment, optionally of all depicted longitudinal bulkhead plates 12, 14, 22, 24, is situated in this embodiment essentially in the direction of the main axis of extension $A_H$. In addition, the main axis of extension of the longitudinal bulkhead plates is arranged orthogonally with respect to the plane defined by Z-Y.

The second moment of area of the backbone pipe 6 is greater by a factor of 1.5, optionally a least by a factor of 2 and further optionally at least by a factor of a least 3 than the second moment of area of the rail pipes 2, 4.

Moreover, in accordance with the invention, at least one bulkhead plate is arranged, and in this embodiment optionally arranged as a longitudinal bulkhead plate, such that it is attached to the backbone pipe 6 in such a way that it runs into the backbone pipe tangentially. This embodiment in particular is shown schematically in FIG. 2 and in detail in FIG. 4. The tangential direction is identified here by the reference sign $R_T$. Optionally, at least one longitudinal bulkhead plate 12, 14, 22, 24 may conceivably be arranged on the backbone pipe in such a way that its central surface, shown in FIG. 4 by the dash-dotted lines 13 and 33, runs tangentially into the central surface 17 of the backbone pipe 6, and in particular, in such a way that its central surface 13, 33 runs into the central surface 17 of the backbone pipe 6 such that it deviates from the tangential direction $R_T$ by no more than a dihedral angle α of ±32°, optionally no more than a dihedral angle α of ±25°, optionally by no more than a dihedral angle α of ±20°, further optionally by no more than a dihedral angle α of ±10°.

Figure 4:
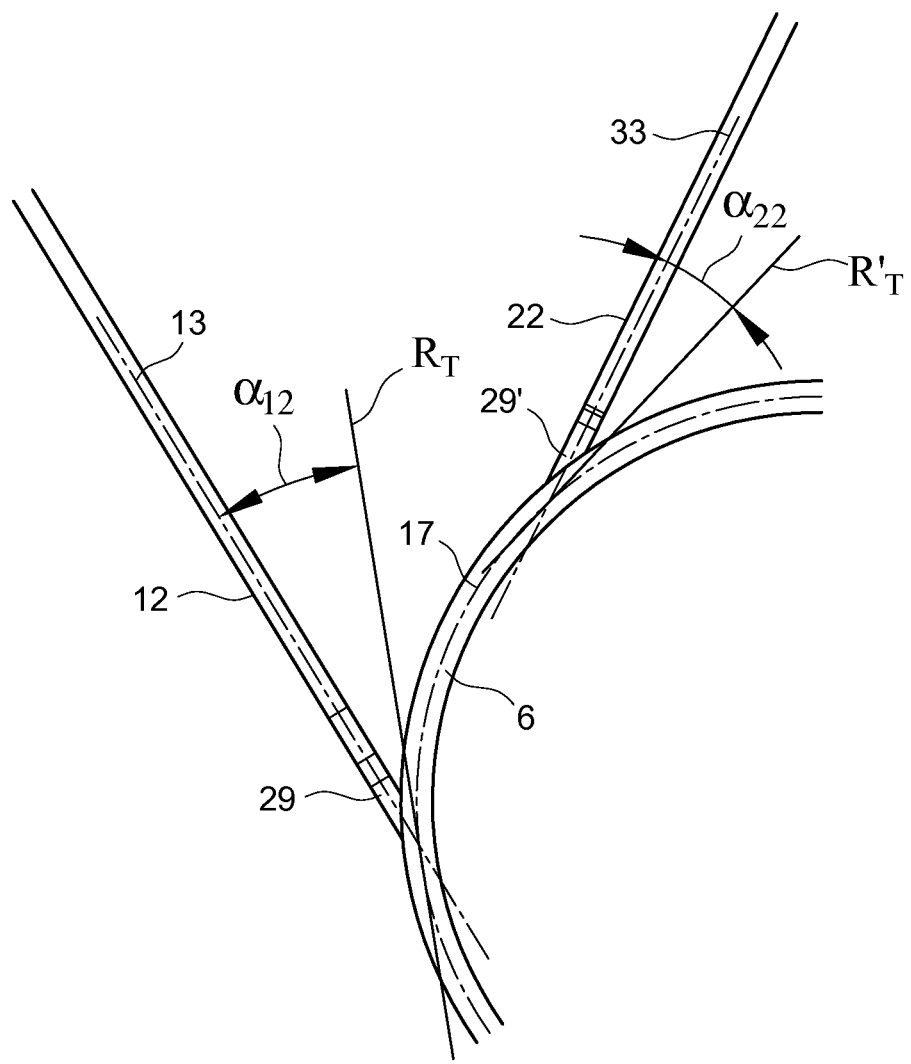
FIG. 4 is a detail section of the embodiment along the section line shown in FIG. 1.

The attachment of the longitudinal bulkhead planes 12 to the backbone pipe 6 and/or to the rail pipe and/or the transverse connecting member may be made by welded joints, shown by way of example in FIG. 4 as a welding seam 29. It is conceivable that no adaptation of the angle of the lateral edge to be attached has been made for the attachment of the longitudinal bulkhead plates to the backbone pipe and/or to the rail pipe and/or to the transverse connecting member and in particular that the lateral edge to be attached has a 90° cutting edge, i.e. in particular a cutting edge such as results from the longitudinal bulkhead plates being cut to length.

As regards the definition of the term "tangential" running-in or attachment, reference is made here to what was said in the relevant passages in the preceding text. It should be noted that the definition of "tangentially running-in" is determined in particular by the alignment or execution of the main axis of extension $A_H$ of the backbone rail. FIG. 1 for example shows a backbone rail 1 which does not have a completely straight alignment, meaning, in particular, that the main axes of extension $A_{H2}$, $A_{H4}$ and $A_{HG}$ of the individual rail pipes 2, 4 or the backbone pipe 6 are not completely parallel with respect to each other. To this extent, the backbone rail 1 cannot be referred to as a straight backbone rail 1. In the case of a straight embodiment, each of the bulkhead plates 12, 14, 22, 24 can be positioned without any problem to run into the backbone pipe 6 tangentially (i.e. coaxially with regard to the axis $R_T$ shown in FIG. 4), whereby the attachment area 7 of the longitudinal bulkhead plates shown in FIG. 1, i.e. the area in which the respective longitudinal bulkhead plate is attached to the backbone pipe 6, in particular, extends along an axis aligned parallel to the main axis of extension $A_H$. In the case of a deviation of the backbone rail 1 from this ideal shape, i.e. if it is curved or twisted, this will result in a deviation from parallelism of the individual main axes of extension $A_{H2}$, $A_{H4}$ and $A_{H6}$ of the rail pipes 2, 4 or the backbone pipe 6. As a result, there is a minor deviation in the tangential running-in of the longitudinal bulkhead plates from the tangential direction $R_T$ or in the orthogonality of the main plane of extension of the bulkhead plates with regard to the bulkhead plane. This is shown in FIGS. 1 and 2. For this reason an essentially "tangential" or "perpendicular" alignment of the main plane of extension of the bulkhead plates relative to the bulkhead plane has to be provided. Further conditions in this regard have already been described above.

The bulkhead plates may conceivably be attached directly to the backbone pipe 6 and the respective rail pipe 2, 4. In this case, the bulkhead plates should preferably run towards the rail pipes 2, 4 tangentially, and preferably in lateral areas in the rail pipe situated opposite the respective other rail pipe. It is also possible for the bulkhead plates 12, 14, 22, 24 to be connected to the respective rail pipe 2, 4 by means of the transverse connecting member 8. This is the case in the embodiments shown here. It is furthermore possible for the transverse connecting member 8 to be arranged in the bulkhead plane, i.e. in the case shown here in the plane defined by the axes Y and Z (see FIG. 2). In this context, at least one longitudinal bulkhead plate in particular is preferably arranged such that it intersects the bulkhead plane. In a further embodiment, central axes $A_M$ (see FIG. 1) of the respective longitudinal bulkhead plates 12, 14, 22, 24 arranged in a bulkhead may conceivably be arranged in the bulkhead plane. Such a central axis $A_M$ may be, for example, an axis running from the centre of the attachment area 7 or a lower end 34 of the bulkhead plate (see FIGS. 1 and 2) to a centre of the upper end 32 of the bulkhead plate. Such an embodiment may be used for all longitudinal bulkhead plates arranged in a bulkhead, however, only some of the longitudinal bulkhead plates arranged in a bulkhead may fulfil this condition.

Optionally it is conceivable that the transverse connecting member 8 is attached to the rail pipes 2,4 with a certain distance from the backbone pipe 6. In this case, the backbone pipe is connected to the transverse connecting member 8 and the rail pipes 2, 4 attached thereto only by means of the longitudinal bulkhead plates 12, 14, 22, 24, as is illustrated clearly in FIG. 2 in particular; the transverse connecting member is not in contact with the backbone pipe.

Optionally, as shown here in particular, a multiplicity of longitudinal bulkhead plates may conceivably be provided on the bulkhead 10, and particularly outer longitudinal bulkhead plates 12, 14 and at least one inner longitudinal bulkhead plate arranged between these outer longitudinal bulkhead plates 12, 14 when viewed in the bulkhead plane, and particularly, two or more inner longitudinal bulkhead plates 22, 24. In a particular embodiment, at least one longitudinal bulkhead plate, and in particular the outer bulkhead plates 12, 14, is/are attached each in an end area 16, 18 of the transverse connecting member 8, and/or the inner, and in particular two and more inner, longitudinal bulkhead plates 22, 24 is/are attached each in an inner area 20 (see FIG. 2) of the transverse connecting member 8, situated between the end areas 16, 18 of the transverse connecting member. In particular in this context it is conceivable for a multiplicity of outer and inner longitudinal bulk-head plates 12, 14, 22, 24 to be arranged such that, viewed in the bulkhead plane, they adopt the shape of a "W" or a similar zig-zag shape. Optional it is conceivable in this context that the angles of the longitudinal bulkhead plates 12, 14, 22, 24 arranged on the backbone pipe 6 relative to the vertical axis z or to the vertical plane defined by the axis Z and the main axis of extension $A_H$, have alternatingly different arithmetic signs, i.e. positive and negative signs. However, it is also possible to provide multiple bulkhead plates having angles with the same arithmetic sign, i.e., for example, multiple bulkhead plates extending from the backbone pipe 6 towards the rail pipe 2 with different angles, and multiple bulkhead plates running from the backbone pipe 6 towards the rail pipe 4 with different angles.

Also, it is possible for at least one inner longitudinal bulkhead plate 22, 24 to be arranged at a certain distance from at least one of the outer longitudinal bulkhead plates 12, 14. This may apply in particular to the attachment points of the longitudinal bulkhead plates on the rail pipe or backbone pipe. As shown in FIG. 2 for example, an upper end 32' or attachment area 32' of an inner longitudinal bulkhead plate 22 is positioned at a distance from the upper end 32" or attachment area 32" of another inner longitudinal bulkhead plate 24 on the transverse connecting member 8. Optionally it is conceivable to arrange the outer longitudinal bulkhead plates 12, 14 in particular in such a manner that they are attached to the transverse connecting member 8 as close as possible to the rail pipes 2, 4, or to the end areas 16, 18 of the transverse connecting member 8, whilst not interfering with the clearance required to guide a vehicle arrangement along the rail pipes 2 and 4.

The longitudinal bulkhead plates optionally provide openings 36 particularly on the end-side, particularly for attachment to the transverse connecting member (see FIG. 1), whose geometry corresponds to a partial area of a cross section of the transverse connecting member 8, thus enabling connection and safe attachment of the longitudinal bulkhead plate to the transverse connecting member 8. In particular, this opening 36 may be elliptical.

As can be seen in FIG. 1 in particular, preferably at least one longitudinal bulkhead plate has at least one pressed-in bead, welded-on stiffener or similar means of reinforcement 36 to increase load-bearing capacity. It is also possible for openings 40 or similar means of weight reduction to be provided on at least one longitudinal bulkhead plate, so as in particular to reduce the total weight of the backbone rail 1 or improve the appearance of the backbone rail. Such an opening may also be provided and arranged for reduction of stress, particularly at the connecting points between bulkhead plate and rail pipe or backbone pipe. In particular, this is the case when the opening is arranged centrally relative to the width of the bulkhead plate.

Also, as is also shown in FIG. 1, at least one longitudinal bulkhead plate is preferably executed such that its width b decreases with increasing distance from the backbone pipe, at least in a section of the longitudinal bulkhead plate. In the case of the embodiment shown in FIG. 1 the width b is greatest in the attachment area 7 of the longitudinal bulkhead plate on the backbone pipe 6, and decreases with increasing distance from the backbone pipe 6 (see width b1). In particular, at least one longitudinal plate may conceivably have a maximum width b in the attachment area 7.

Figure 5:
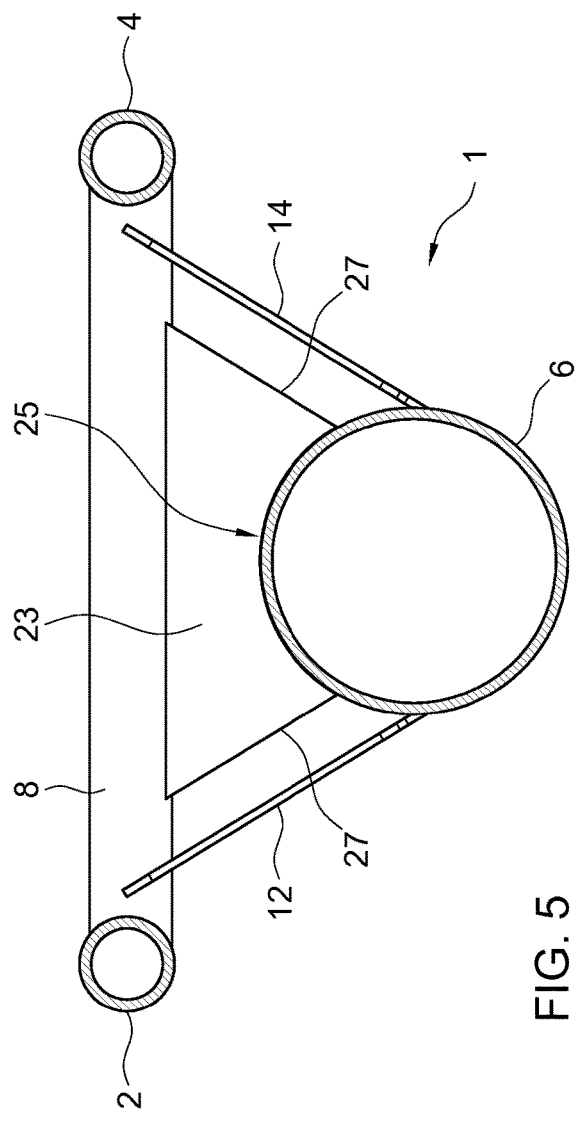
FIG. 5 is a cross section of a further embodiment of the backbone rail according to the invention along a section line shown in FIG. 1.
Figure 6:
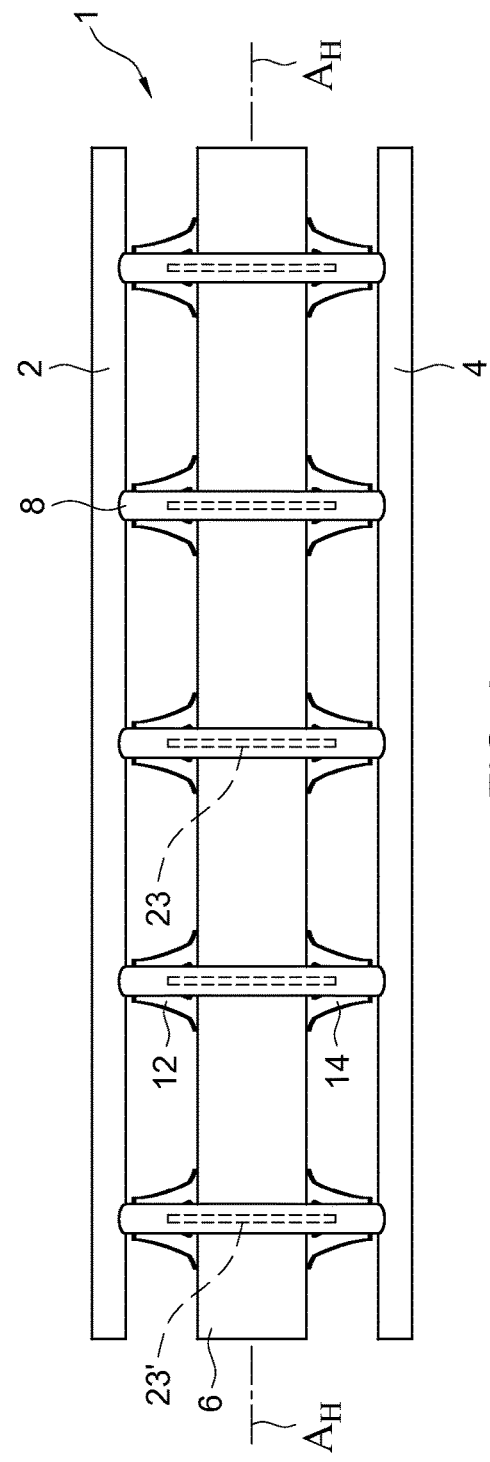
FIG. 6 is a plan view of the embodiment according to FIG. 5 along a line of view shown in FIG. 1.

FIGS. 5 and 6 show a further embodiment of the backbone rail 1 in accordance with the invention, whose basic structure corresponds to the embodiment shown in FIGS. 1 to 4. In this embodiment, however, one transverse bulkhead plate 23 is provided instead of two inner longitudinal bulkhead plates 22, 24 (see FIG. 2 in particular), whose main plane of extension runs in particular between the longitudinal bulkhead plates 12, 14. In such an embodiment, a plan view of the backbone rail, i.e. a view in a direction perpendicular to a plane defined by the rail pipes 2, 4 and the transverse connecting member 8, shows the shape of the letter "H", made up by the longitudinal bulkhead plates 12, 14 and the transverse bulkhead plate 23. In this embodiment, the transverse bulkhead plate 23 may be designed to run into the transverse connecting member 8 from below. On the side opposite to the transverse connecting member 8, the transverse bulkhead 23 optionally has an opening 25 which essentially corresponds to the outside edge of the backbone pipe 6, thus enabling a close-fitting placement of the backbone pipe on the transverse bulkhead plate 23 and enabling subsequent attachment and particularly welding. In particular, such an opening may be elliptical in shape. Conceivably, at least one lateral edge 27 of the transverse bulkhead plate 23 may be arranged at a distance from at least one longitudinal bulkhead plate 12, 14 and optionally, in this embodiment, both lateral edges 27 may be arranged at a distance from the longitudinal bulkhead plates 12, 14. It is also conceivable, however, for the transverse bulkhead plate 23 to be designed such that it can be attached, and specifically, welded, to at least one longitudinal bulkhead plate 12, 14 or to all longitudinal bulkhead plates 12, 14 in particular. In particular, lateral contact with lateral edges of the at least one longitudinal bulkhead plate is conceivable. It is also conceivable for the transverse bulkhead plate to be designed such that it does not run into the transverse connecting member 8 from below, but rather runs into or adjoins the transverse connecting member laterally and in particular tangentially. Such embodiments are shown in FIGS. 7 to 9.

Figure 7:
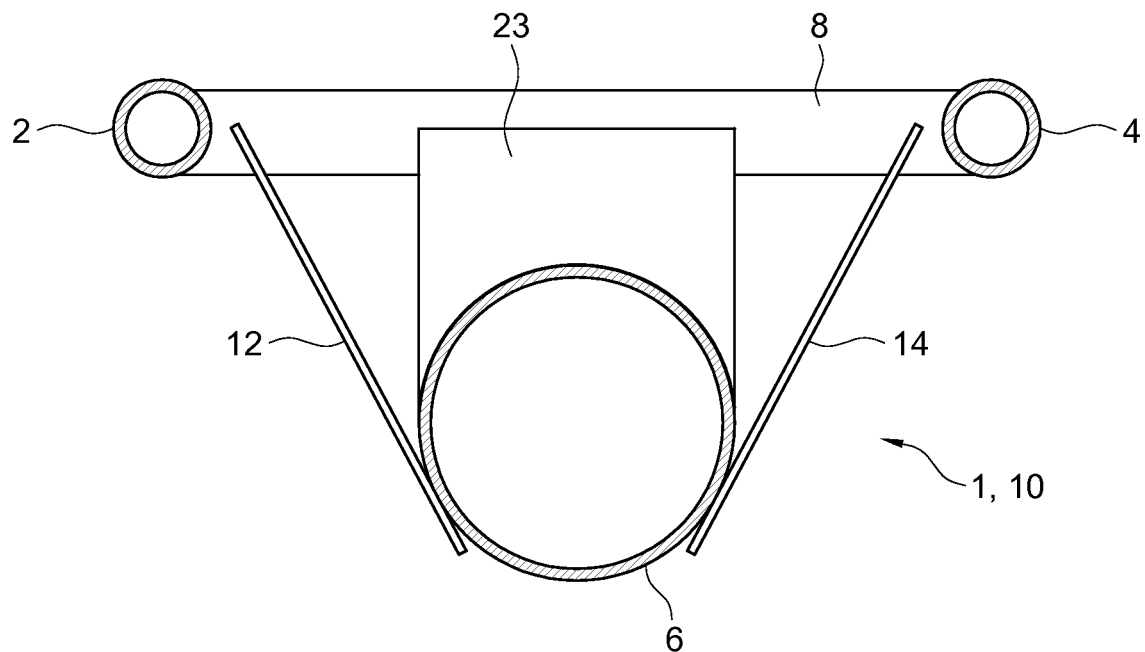
FIG. 7 is a cross section of a further embodiment along a section line shown in FIG. 1.

FIG. 7 for example shows a transverse bulkhead plate 23 attached laterally to a transverse connecting member 8. The transverse connecting member in turn connects rail pipes 2, 4. The embodiment shown in FIG. 7 also exhibits longitudinal bulkhead plates 12, 14 attached tangentially to the backbone pipe 6. In this case the longitudinal bulkhead plates 12, 14 are designed in such a way that they are fully in contact with the backbone pipe 6 and are welded only in the contact area between the backbone pipe 6 and the longitudinal bulkhead plate 12, 14. Exact cutting to length of the longitudinal bulkhead plate 12, 14 is therefore not necessary. In particular one embodiment has at least one longitudinal bulkhead plate designed to be tangentially in contact with the backbone pipe 6.

Figure 8:
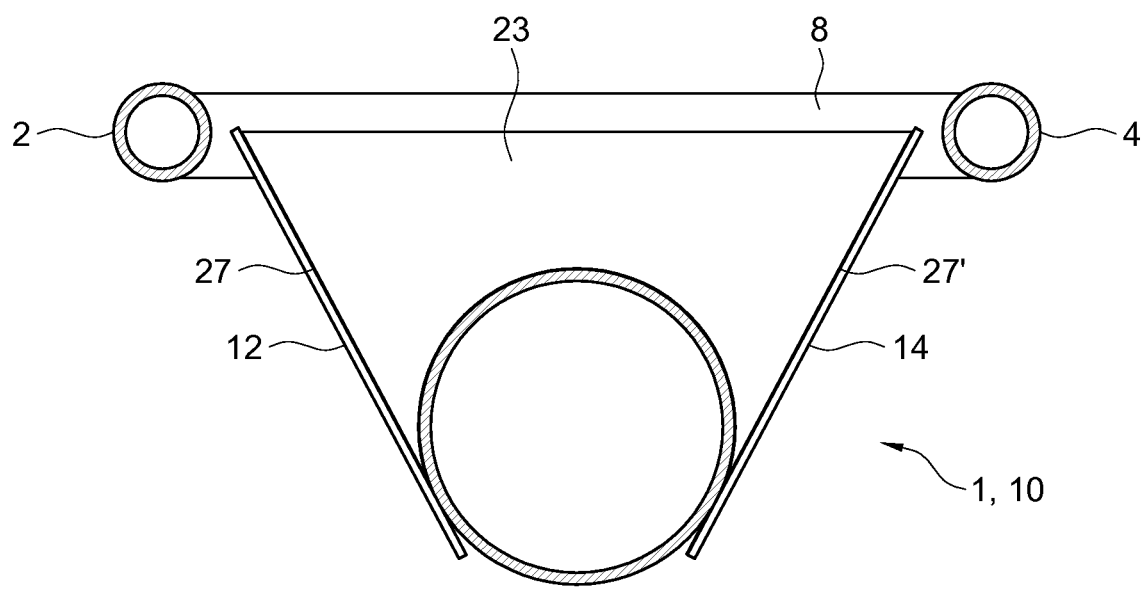
FIG. 8 is a cross section of a further embodiment along a section line shown in FIG. 1.
Figure 9:
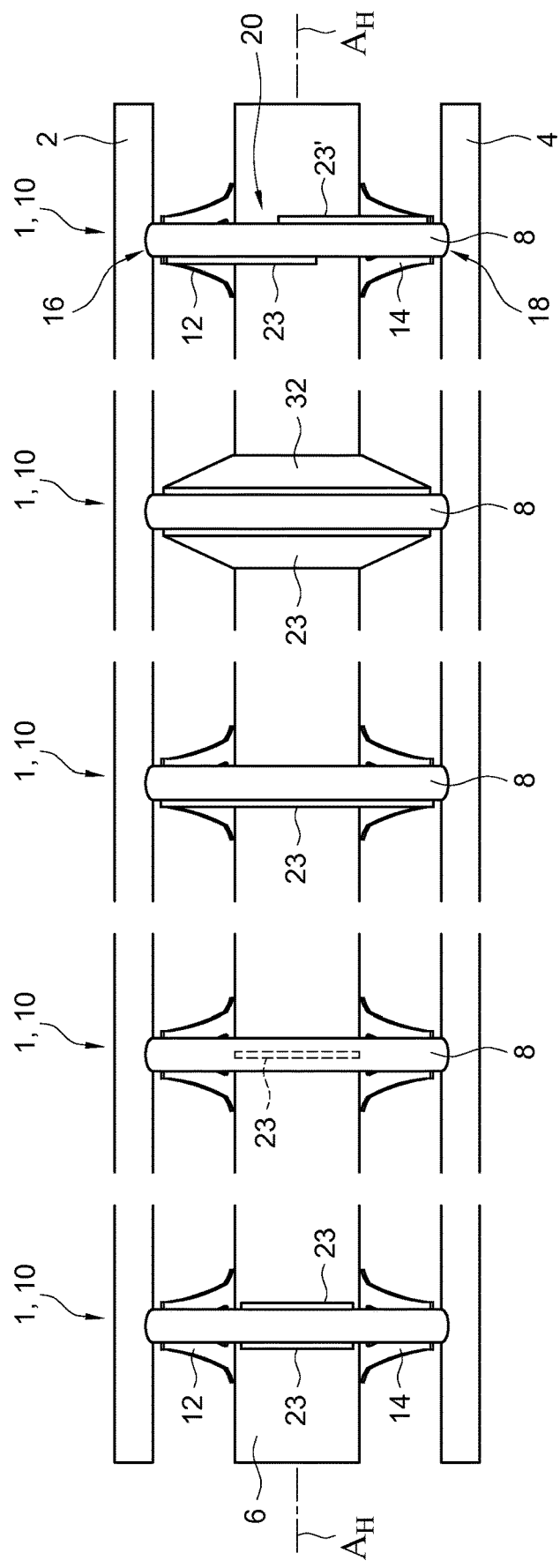
FIGS. 9A to 9E are plan views of various embodiments of a backbone rail along a line of view shown in FIG. 1.

In the case of the embodiment shown in FIG. 8, which is largely similar to the embodiment as per FIG. 7, the transverse bulkhead plate 23 is once again designed so that it is tangentially in contact with the transverse connecting member 8, but in this case, with its lateral edges 27 adjoining, or attached to, and in particular welded to, the respective longitudinal bulkhead plates 12, 14.

FIGS. 9A to 9E show different embodiments of the backbone rail 1 in accordance with the invention, and in particular different bulkheads 10 in a plan view.

In all depicted embodiments, rail pipes 2, 4 are connected by means of longitudinal bulkheads 12, 14 with a backbone pipe 6. In a central surface 20 of the transverse connecting member 8, situated between end areas 16, 18 of the transverse connecting member 8, the embodiments shown in FIGS. 9A to 9E provide transverse bulkhead plates 23 also running between the transverse connecting member 8 and the backbone pipe 6.

The detail in FIG. 9A shows two transverse bulkhead plates 23, which may optionally be designed according to the embodiment in accordance with FIG. 7. In particular, it is possible in principle to provide transverse bulkhead plates extending in the bulkhead plane and in particular extending orthogonally to the backbone pipe 6 towards the transverse connecting member 8; it is also possible to provide the bulkhead plates 23 with an inclination, and particularly with an inclination in the direction of the main axis of extension $A_H$, and particularly with an inclination about an axis extending in the bulkhead plane and between the longitudinal bulkhead plates.

FIG. 9B shows a further embodiment in which one bulkhead plate 23 is designed in accordance with the embodiment in accordance with FIG. 7, but introduced into and/or attached to the latter from below.

The embodiment in accordance with FIG. 9C is an embodiment corresponding to the embodiment shown in FIG. 8. Here too, a bulkhead plate 23 is tangentially attached to the transverse connecting member 8. In principle, it is conceivable that the transverse bulkhead plate is designed such that it runs into the transverse connecting member 8 from below. "From below" optionally means a direction deviating from the tangential direction, i.e. in particular an orthogonal, butt or angular contact with the transverse connecting member.

FIG. 9D shows an embodiment in which two transverse bulkheads 23 are attached to the transverse connecting member 8 and the longitudinal bulkhead plates 12, 14 and in particular to its peripheral areas. In addition the transverse bulkheads 23 may be designed with an inclination relative to the bulkhead plane.

Finally, FIG. 9E shows an embodiment in which the bulkhead plates 23 are connected to only one longitudinal bulkhead plate 23 each, and/or are offset in the direction of one longitudinal bulkhead plate 12,14. In principle, the arrangement of bulkhead plates as described above, and in particular represented in the different embodiments, can be combined arbitrarily.

Figure 10:
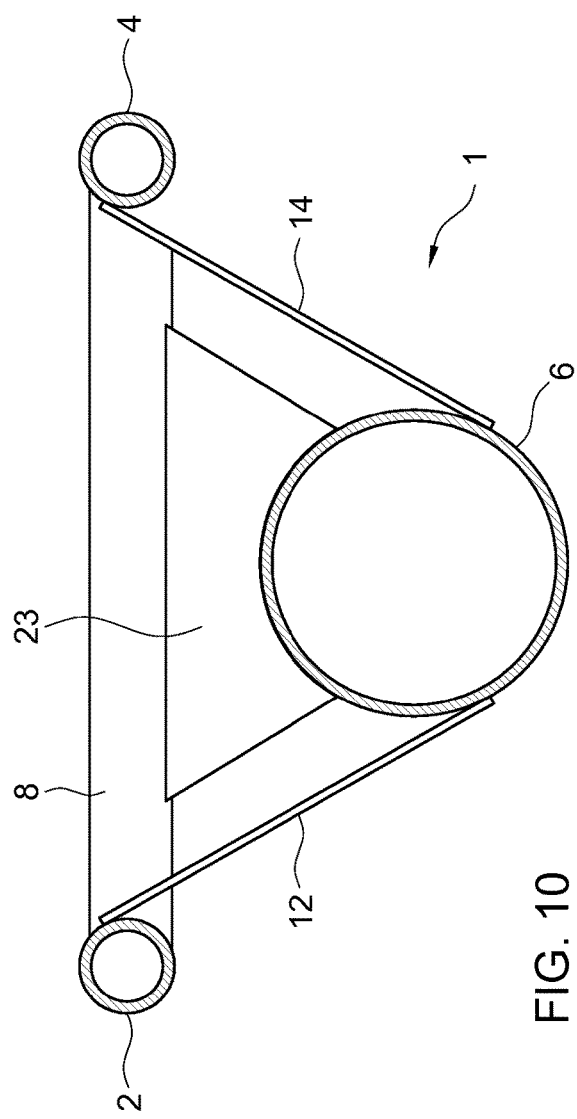
FIG. 10 is a cross section of a further embodiment of the backbone rail according to the invention.
Figure 11:
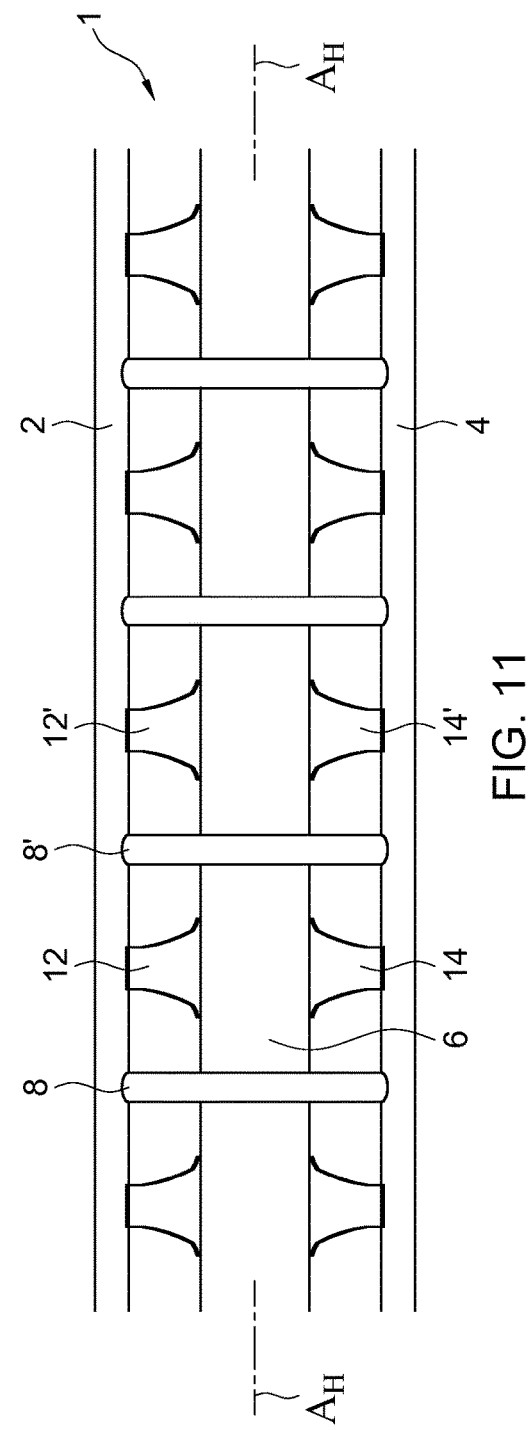
FIG. 11 is a plan view of the embodiment according to FIG. 10.

FIGS. 10 and 11 show a further embodiment of the backbone rail 1 in accordance with the invention, which, in its basic structure, corresponds to the embodiment shown in FIGS. 1 to 4 and 5 and 6. In this embodiment, however, the at least one longitudinal bulkhead plate 12,14 is not only attached tangentially to the backbone pipe 6, but also attached to the rail pipe 2,4, so as to tangentially run into the respective rail pipe 2, 4. Preferably, two opposing longitudinal bulkhead plates are tangentially attached to the rail pipes. In addition, at least one transverse connecting member 8 is arranged to extend in the bulkhead plane, whereby the bulkhead plane may be formed here preferably by transverse bulkhead plates, as is described in particular in relation to FIGS. 5 and 6 and 7 to 9. Further optionally, the longitudinal bulkhead plate 12, 14 is arranged outside the bulkhead plane. This results in a more uniform distribution of the number of welds along the main axis of extension of the backbone rail, which, besides other aspects, improves weldability.

With this embodiment in particular, it is possible for the transverse connecting members to be designed as transverse connecting plates.

The descriptions of the systems and/or methods referred to in this document are provided for illustration only; they are not to be understood as limiting the enclosed claims to a specific embodiment or group of embodiments. It is to be noted when interpreting the enclosed claims, that the word "comprising" does not preclude the presence of other elements or actions than those listed in a specific claim, and that the use of the singular form for a specific element does not preclude the presence of a multiplicity of such elements; any reference signs used in the claims do not limit their scope; multiple "means" may be represented by the same object and/or different objects or implemented structure or function; any of the fixtures or functions disclosed, or parts thereof, may be combined with each other or subdivided into further parts, unless specifically stated otherwise. The mere fact that specific measures are listed in separate, different claims, is not to be understood as precluding the advantageous use of a combination of such measures. In particular, all functioning combinations of the claims are to be deemed to be inherently disclosed. Unless specifically stated otherwise, terms such as "essentially", "approximately" or "in general/generally" are to be interpreted in the context of this description as including deviations of a measurement of at least 10% or less, preferably 5% or less, or deviations from a shape which a person skilled in the art would still accept as falling within the scope of the corresponding definition.

In addition, within the scope of the invention, the terms "tangential" "parallel", "perpendicular" and "orthogonal" are to be understood as allowing a certain deviation from these specifications, particularly in connection with manufacturing tolerances, so that these definition are to be interpreted as meaning "essentially tangential", "essentially parallel", "essentially perpendicular" and "essentially orthogonal".

LIST OF REFERENCE SIGNS

1 Backbone rail
2 Rail pipe
4 Rail pipe
6 Backbone pipe
7 Attachment area or foot area
8 Transverse connecting member
10 Outer longitudinal bulkhead plate
13 Central surface
14 Outer longitudinal bulkhead plate
16 End area
17 Central surface
18 End area
20 Inner area
22 Inner longitudinal bulkhead plate
23 Transverse bulkhead plate
24 Inner longitudinal bulkhead plate
25 Opening
27 Lateral edge
28 Means of reinforcement
29 Welding seam
32 Upper end of bulkhead plate
33 Central surface
34 Lower end of bulkhead plate
36 Opening
40 Opening

The invention claimed is:

1. Backbone rail for a roller coaster or similar rail-running amusement ride, constructed based on the principle of the frame load-bearing effect of a Vierendeel girder, comprising two rail pipes designed for a vehicle arrangement to travel upon, and at least one main load-bearing, backbone pipe not designed for vehicles to travel upon, whose second moment of area is greater than the second moment of area of the rail pipes at least by a factor of 1.5, wherein, viewed in a main axis of extension (AH) of the backbone rail, the rail pipes and the backbone pipe are connected section-by-section by means of shear stiffening bulkheads, wherein at least one bulkhead comprises:

a transverse connecting member, which connects the rail pipes to each other and, extending orthogonally to the main axis of extension (AH) of the backbone rail between the rail pipes, is attached to the rail pipes, and bulkhead plates, connecting at least one of the rail pipes to the backbone pipe, characterised in that at least one of the bulkhead plates is (a) designed as a longitudinal bulkhead plate whose main plane of extension is perpendicular to a bulkhead plane, said bulkhead plane being a normal section through the main axis of extension of the backbone rail, and (b) attached to the backbone pipe in such a way that the longitudinal bulkhead plate runs tangentially into the backbone pipe, and (c) which runs directly between the backbone pipe and the rail pipe, or is attached to the rail pipe by means of the transverse connecting member, wherein the longitudinal bulkhead plate is attached to one end area of the transverse connecting member.

2. The backbone rail in accordance with claim 1, characterised in that the at least one longitudinal bulkhead plate is arranged on the backbone pipe in such a way that a central surface thereof runs tangentially, in a tangential direction to the main axis of extension, into a central surface of the backbone pipe.

3. The backbone rail in accordance with claim 1, characterised in that the transverse connecting member is designed as a hollow profile or as a pipe.

4. The backbone rail in accordance with claim 1, characterised in that
the longitudinal bulkhead plate is attached to the rail pipe in such a way that it runs tangentially into the rail pipe.

5. The backbone rail in accordance with claim 4, characterised in that
the transverse connecting member is designed as a transverse connecting plate.

6. The backbone rail in accordance with claim 1, characterised in that
a multiplicity of outer longitudinal bulkhead plates is provided on the bulkhead, and at least one inner longitudinal bulkhead plate is situated between the outer longitudinal bulkhead plates when viewed in the bulkhead plane.

7. The backbone rail in accordance with claim 6, characterised in that
the multiplicity of outer longitudinal bulkhead plates and the at least one inner longitudinal bulkhead plate are arranged such that they adopt the shape of a "W" or similar zig-zag shape when viewed in the bulkhead plane.

8. The backbone rail in accordance with claim 1, characterised in that
at least two longitudinal bulkhead plates are provided, and
at least one bulkhead plate is designed as a transverse bulkhead plate, whose main plane of extension extends between the at least two longitudinal bulkhead plates and/or is designed in such a way that a plan view of the backbone rail, the plan view being in a direction orthogonal to a plane defined by the rail pipes, and the transverse connecting member adopt the shape of a letter "H", formed by the at least two longitudinal bulkhead plates and the transverse bulkhead plate.

9. The backbone rail in accordance with claim 1, characterised in that
a width of the at least one longitudinal bulkhead plate decreases at least over a section of the longitudinal bulkhead plate with increasing distance from the backbone pipe.

10. The backbone rail in accordance with claim 1, characterised in that
the at least one longitudinal bulkhead plate has at least one pressed-in bead, welded-on stiffener or reinforcement to increase load-bearing capacity.

11. Roller coaster arrangement, comprising a vehicle arrangement and at least one backbone rail in accordance with claim 1, wherein the vehicle arrangement is designed to be attached or capable of attachment to the at least one backbone rail in such a way that said vehicle arrangement is configured to move along the at least one backbone rail.

12. The backbone rail in accordance with claim 2, wherein the central surface of the at least one longitudinal bulkhead plate runs into the central surface of the backbone pipe deviating by no more than a maximum dihedral angle $\alpha$ of $\pm 25°$.

13. The backbone rail in accordance with claim 12, wherein the deviating is by no more than a maximum dihedral angle $\alpha$ of $\pm 20°$.

14. The backbone rail in accordance with claim 12, wherein the deviating is by no more than a maximum dihedral angle $\alpha$ of $\pm 10°$.

* * * * *